United States Patent
Burkholder et al.

(10) Patent No.: US 10,074,954 B1
(45) Date of Patent: Sep. 11, 2018

(54) HIGH EFFICIENCY, LOW COST, LASER POWER SUPPLY

(71) Applicant: nLight Photonics Corporation, Vancouver, WA (US)

(72) Inventors: Gary L. Burkholder, Camas, WA (US); Walter R. Sanders, Vancouver, WA (US)

(73) Assignee: nLIGHT, Inc., Vancouver, WA (US)

( * ) Notice: Subject to any disclaimer, the term of this patent is extended or adjusted under 35 U.S.C. 154(b) by 99 days.

(21) Appl. No.: 14/790,737

(22) Filed: Jul. 2, 2015

Related U.S. Application Data (60) Provisional application No. 62/020,774, filed on Jul. 3, 2014.

(51) Int. Cl.
 *H01S 3/04* (2006.01)
 *H05K 7/20* (2006.01)
 *H01S 3/067* (2006.01)
 *H01S 3/0941* (2006.01)

(52) U.S. Cl.
 CPC .......... *H01S 3/0404* (2013.01); *H01S 3/0405* (2013.01); *H01S 3/0407* (2013.01); *H01S 3/06704* (2013.01); *H01S 3/0941* (2013.01); *H05K 7/2039* (2013.01); *H05K 7/20145* (2013.01); *H05K 7/20254* (2013.01)

(58) Field of Classification Search
 CPC .... H01S 3/0404; H01S 3/0941; H01S 3/0405; H01S 3/0407; H01S 3/06704; H05K 7/20145; H05K 7/20254; H05K 7/2039; H01L 23/473
 See application file for complete search history.

(56) References Cited

U.S. PATENT DOCUMENTS

| | | | | |
|---|---|---|---|---|
| 4,978,197 | A * | 12/1990 | Horikawa | B23K 26/0604 359/629 |
| 2002/0012375 | A1* | 1/2002 | Thompson | H01S 3/225 372/58 |
| 2005/0013328 | A1* | 1/2005 | Jurgensen | B23K 26/0604 372/6 |
| 2011/0249321 | A1* | 10/2011 | Savage-Leuchs | G02B 6/02009 359/341.3 |

* cited by examiner

*Primary Examiner* — Xinning Niu
(74) *Attorney, Agent, or Firm* — Klarquist Sparkman, LLP (57) ABSTRACT

The present application relates to air-cooled electronic devices. An exemplary apparatus has an enclosure including one or more interior surfaces. The interior surfaces at least partially define a plenum. A support member is situated in the enclosure and defines a position reference plane, which can at least partially define the plenum. The apparatus further includes an air-to-fluid heat exchanger situated in the enclosure adjacent the support member, and one or more device bays configured to receive at least one corresponding electronic device. The device bays can be located adjacent the support member such that the position reference plane defines a boundary between the device bays and the plenum. The device bays, the plenum, and the air-to-fluid heat exchanger are in fluid communication with one another along a flow path defined within the enclosure, and the enclosure restricts an air flow along the flow path from exiting the enclosure.

22 Claims, 8 Drawing Sheets

HIGH EFFICIENCY, LOW COST, LASER POWER SUPPLY

CROSS REFERENCE TO RELATED APPLICATION

This application claims the benefit of U.S. Provisional Patent application No. 62/020,774, filed Jul. 3, 2014, which is incorporated herein by reference in its entirety.

FIELD

The present application relates to air-cooled electronic devices.

BACKGROUND

Commercial off-the-shelf power supplies for use in high-power applications are typically air-cooled. However, cooling systems for such power supplies are susceptible to clogging and reduced performance when used in dirty or dusty environments, such as industrial cutting environments, because of particulates entrained in the air. Thus, when incorporated in an industrial cutting laser such as a fiber laser system, air-cooled power supplies can suffer from overheating. Water-cooled power supplies typically used in such applications must be custom ordered, and are costly and suffer from long lead times. Additionally, because of the relatively low production volumes associated with water-cooled power supplies, they typically lack the latest efficiency-increasing features found on higher production volume, air-cooled, power supply units. Accordingly, improvements to power supplies for high-power applications are desirable.

SUMMARY

Disclosed embodiments of the present application provide apparatuses for cooling electronic devices that address certain deficiencies of known apparatuses. In one representative embodiment, an apparatus comprises an enclosure including one or more interior surfaces, the one or more interior surfaces at least partially defining a plenum, and a support member situated in the enclosure and defining a position reference plane, the position reference plane at least partially defining the plenum. The apparatus further comprises an air-to-fluid heat exchanger situated in the enclosure adjacent the support member, and one or more device bays configured to receive at least one corresponding electronic device. The one or more device bays can be located adjacent the support member such that the position reference plane defines a boundary between the one or more device bays and the plenum. The one or more device bays, the plenum, and the air-to-fluid heat exchanger are in fluid communication with one another along a flow path defined within the enclosure, and the enclosure restricts an air flow along the flow path from exiting the enclosure.

In another representative embodiment, a method comprises positioning an air-to-fluid heat exchanger within an enclosure, the enclosure at least partially defining a plenum. The method further comprises defining a position reference plane within the enclosure, the position reference plane at least partially defining the plenum, and defining one or more device bays within the enclosure. The one or more device bays can be configured to receive at least one corresponding electronic device, and the position reference plane can define a boundary between the one or more device bays and the plenum. The method further comprises defining a flow path within and bounded by the enclosure, with the flow path fluidly coupling the air-to-fluid heat exchanger to the one or more device bays via the plenum. The method further comprises positioning at least one fan in the flow path to produce air flow along the flow path, and defining a liquid pathway into the enclosure so that the air-to-fluid heat exchanger is fluidly coupled to an external coolant source.

In another representative embodiment, a fiber laser system comprises a seed optical source, an active fiber coupled to receive a seed pulse from the seed optical source, a pump combiner coupled to the active fiber and to at least one pump source, and at least one pump fiber coupled to the pump combiner and to the at least one pump source so as to deliver pump radiation to the active fiber. The system further comprises an apparatus including an enclosure having one or more interior surfaces, the one or more interior surfaces at least partially defining a plenum. The apparatus further comprises a support member situated in the enclosure and defining a position reference plane, with the position reference plane at least partially defining the plenum. The apparatus further comprises an air-to-fluid heat exchanger situated in the enclosure adjacent the support member, and one or more device bays defined within the enclosure and configured to receive at least one corresponding electronic device. The one or more device bays are located adjacent the support member such that the position reference plane defines a boundary between the one or more device bays and the plenum. The enclosure defines a flow path such that the one or more device bays, the plenum, and the air-to-fluid heat exchanger are in fluid communication with one another, and the enclosure restricts air flow along the flow path from exiting the enclosure.

The foregoing and other features and advantages of the disclosed technology will become more apparent from the following detailed description, which proceeds with reference to the accompanying figures.

DETAILED DESCRIPTION

For purposes of this description, certain aspects, advantages, and novel features of the embodiments of this disclosure are described herein. The disclosed methods, apparatuses, and systems should not be construed as limiting in any way. Instead, the present disclosure is directed toward all novel and nonobvious features and aspects of the various disclosed embodiments, alone and in various combinations and sub-combinations with one another. The methods, apparatuses, and systems are not limited to any specific aspect or feature or combination thereof, nor do the disclosed embodiments require that any one or more specific advantages be present or problems be solved.

Features or characteristics described in conjunction with a particular aspect, embodiment or example of the disclosure are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any depicted embodiments. The invention extends to any novel or non-obvious combination of one or more features disclosed in this specification (including any accompanying claims, abstract and drawings), or to any novel or non-obvious feature or combination of features of any disclosed method or process.

Although the operations of some of the disclosed methods are described in a particular, sequential order for convenient presentation, it should be understood that this manner of description encompasses rearrangement, unless a particular ordering is required by specific language. For example, operations described sequentially may in some cases be rearranged or performed concurrently. Moreover, for the sake of simplicity, the attached figures may not show the various ways in which the disclosed methods can be used in conjunction with other methods. As used herein, the terms "a", "an", and "at least one" encompass one or more of the specified element. That is, if two of a particular element are present, one of these elements is also present and thus "an" element is present. The terms "a plurality of" and "plural" mean two or more of the specified element.

In the following description, certain terms may be used such as "up," "down," "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object.

As used herein, the term "and/or" used between the last two of a list of elements means any one or more of the listed elements. For example, the phrase "A, B, and/or C" means "A", "B,", "C", "A and B", "A and C", "B and C", or "A, B, and C."

As used herein, the term "coupled" generally means physically coupled or linked and does not exclude the presence of intermediate elements between the coupled items absent specific contrary language.

In some examples, values, procedures, or apparatus' are referred to as "lowest," "best," "minimum," or the like. It will be appreciated that such descriptions are intended to indicate that a selection among many functional alternatives can be made, and such selections need not be better, smaller, or otherwise preferable to other selections.

Figure 1:
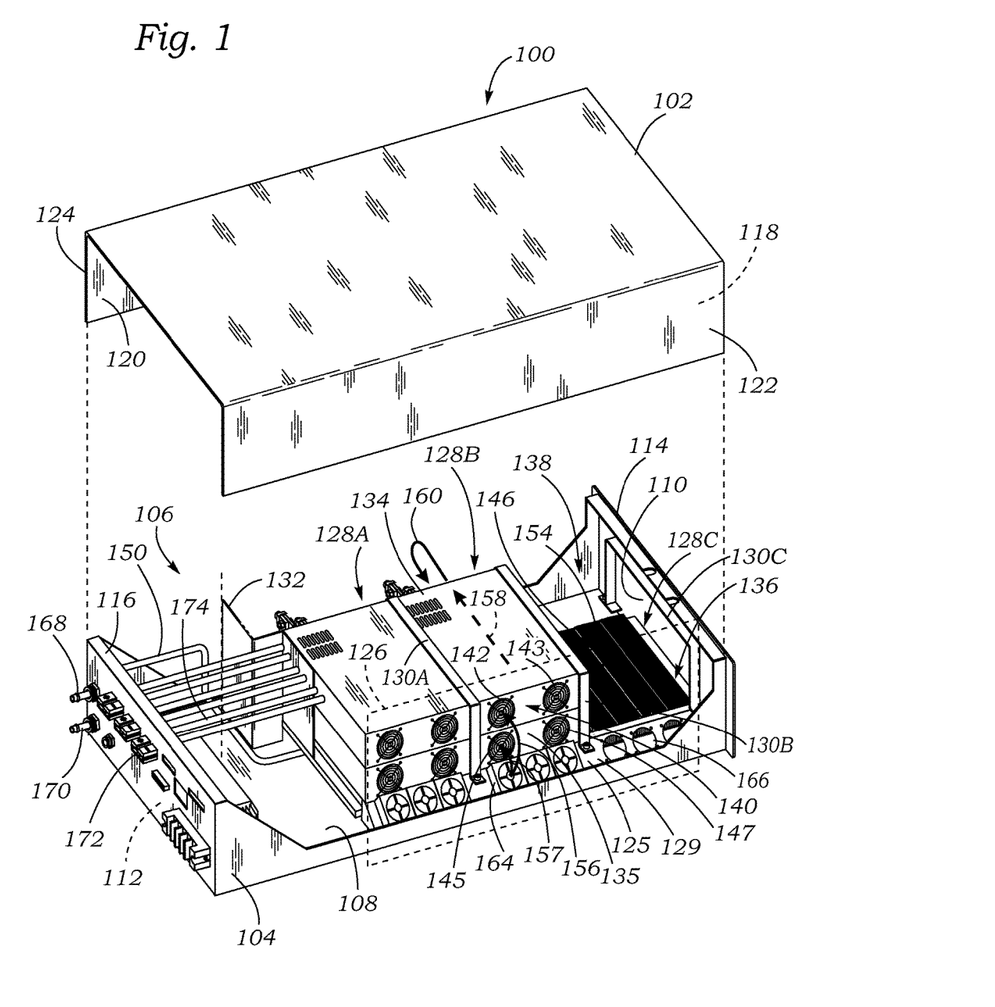
FIG. 1 is a perspective view of an apparatus including one or more electronic devices, and illustrating a first plenum of the apparatus.

FIG. 1 illustrates a representative embodiment of an apparatus 100 comprising a top portion 102 and a bottom portion 104. The top portion 102 can be configured to engage the bottom portion 104 such that together the top and bottom portions 102, 104 define an enclosure 106. The enclosure 106 can include a lower interior surface 108 defined by the bottom portion 104, and front and rear interior surfaces 110, 112 defined by respective front and rear walls 114, 116 of the bottom portion 104. The enclosure 106 is further defined by two interior side surfaces 118, 120 of respective side walls 122, 124 of the top portion 102. In some embodiments, the apparatus 100 can be configured for modular connection to and removal from a larger system, such as a fiber laser system, a server, etc. In some embodiments, the apparatus 100 can include a handle 176 (FIG. 2) for placing and removing the apparatus 100 from a larger system.

Figure 2:
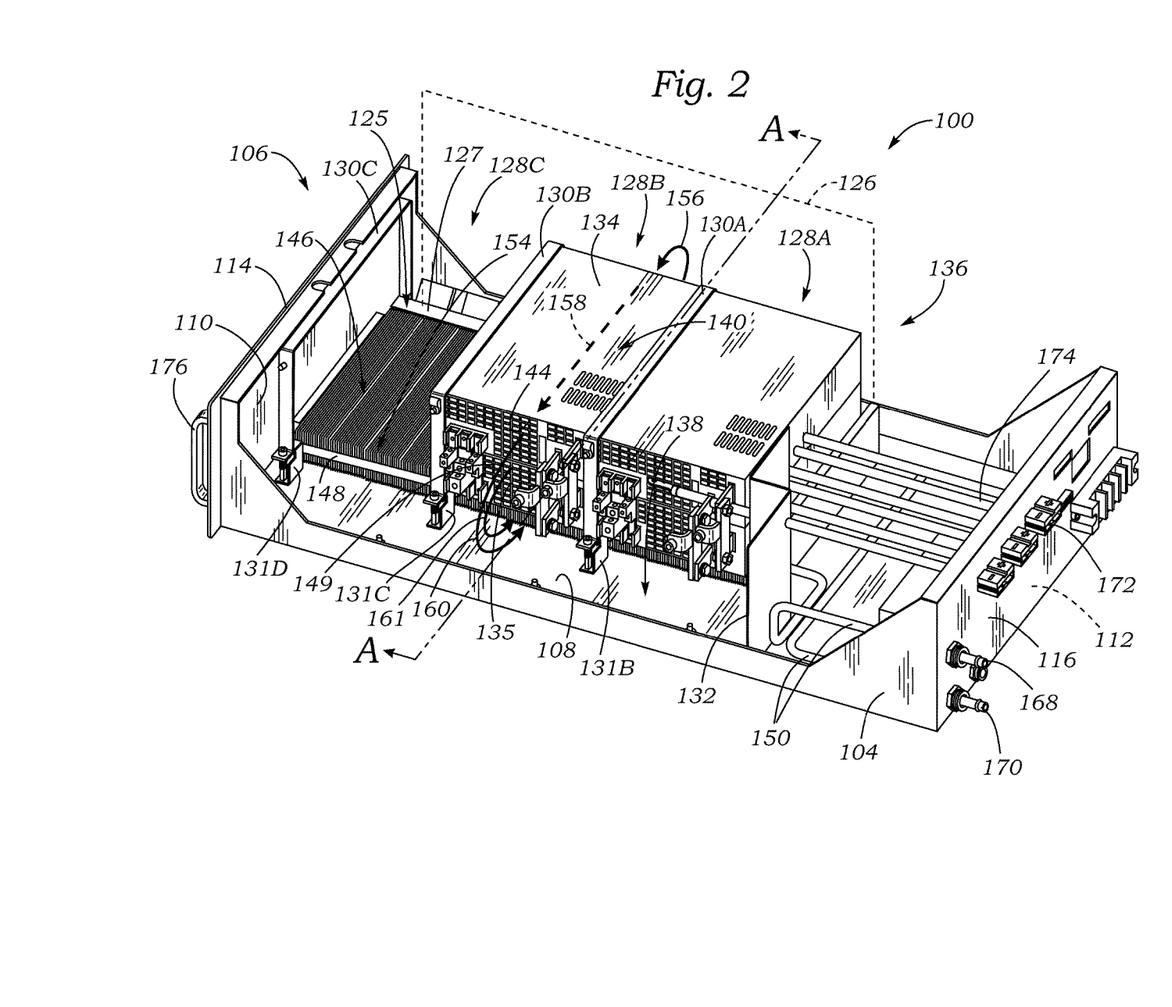
FIG. 2 is a perspective view of the apparatus of FIG. 1 illustrating a second plenum of the apparatus.
Figure 3:
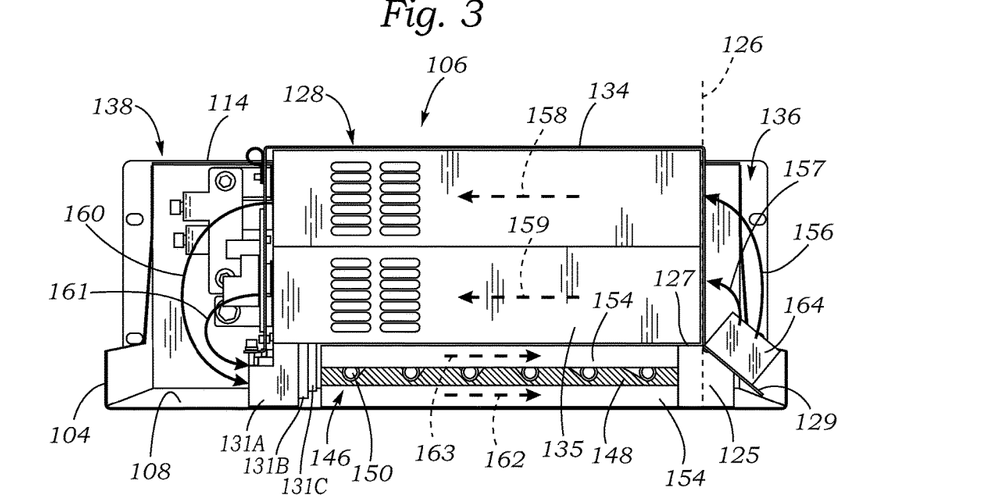
FIG. 3 is a cross-sectional view of the apparatus of FIG. 1 taken along line A-A of FIG. 2.

The apparatus 100 can further include a first support member 125 (FIGS. 1 and 3), and one or more second support members, such as second support members 131A, 131B, 131C, and 131D, disposed on the lower interior surface 108 of the enclosure 106, as best shown in FIGS. 2 and 3. The first support member 125 and the second support members 131A, 131B, 131C, 131D can cooperate to support one or more electronic devices within the enclosure 106, as further described below. The first support member 125 can include an upper surface 127 and an angled surface 129, as shown in FIG. 3, and can define a position reference plane 126 (indicated in phantom) within the enclosure 106. In some embodiments, the position reference plane 126 can be coincident with an edge of the upper surface 127 such that a surface of an electronic device supported by the first support member 125 can be adjacent the position reference plane 126, as further described below.

The apparatus 100 can also include device bays 128A, 128B, and 128C within the enclosure 106. In the embodiment shown, the device bays 128A, 128B, and 128C can be at least partially defined by dividers 130A, 130B, 130C. The dividers 130A, 130B, 130C can be coupled to the lower interior surface 108, and can be oriented so as to be perpendicular to the side walls 122, 124 and/or other surfaces of the top portion 102 and the bottom portion 104. In the embodiment shown, the apparatus 100 includes the three device bays 128A, 128B, 128C, with the mounting bay 128A being at least partially defined by the divider 130A and a bent metal sheet 132. In alternative embodiments, the apparatus 100 can include any suitable number of device bays defined by any suitable number of dividers and/or other types of interior structure.

Referring to FIGS. 1-3, the position reference plane 126, together with the lower interior surface 108, the front and rear interior surfaces 110, 112, and the interior side surface 118, can at least partially define a first plenum 136 within the enclosure 106. In the embodiment shown, the position reference plane 126 can define a boundary between the device bays 128A, 128B, and 128C, and the first plenum 136. The first plenum 136 can be in fluid communication with the device bays 128A, 128B, 128C, and with a second plenum 138 located on the opposite side of the enclosure 106 from the first plenum 136. The second plenum 138 can be at least partially defined by the lower interior surface 108, the front and rear interior surfaces 110, 112, and the interior side surface 120, similar to the first plenum 136. In this manner, the enclosure 106 can define a flow path 140, along which air can be circulated through the enclosure 106. The flow path 140 can extend from the first plenum 136, through the device bays 128A, 128B, and 128C, and into the second plenum 138, as shown by flow lines 156, 157, 158, and 159. The flow path 140 can further extend from the second plenum 138 back to the first plenum 136 beneath the device bays 128A, 128B, 128C, as indicated by flow lines 160, 161, 162, and 163 (see FIGS. 2 and 3). In this manner, air can be circulated along the flow path 140 within the enclosure 106, which can restrict air flow from entering or exiting the enclosure, thereby inhibiting contamination from the exterior environment.

The device bays 128A, 128B, 128C can be configured to receive one or more electronic devices, such as representative electronic devices 134 and 135 situated in device bay 128B. Although portions of the following discussion proceed with respect to the device bay 128B and the electronic devices 134 and 135 for purposes of illustration, it should be understood that the following discussion is applicable to any of the electronic devices and/or device bays disclosed herein. In some embodiments, the device bays 128A, 128B, and 128C can be configured to receive two electronic devices in a stacked arrangement. For example, the device bay 128B can be configured to receive the electronic devices 134, 135 in a stacked arrangement with the electronic device 134 disposed above the electronic device 135. However, in alternative embodiments, the device bays 128A, 128B, and 128C can be configured to receive any suitable number of electronic devices arranged in any suitable arrangement. In the embodiment of FIG. 1, the device bay 128C is shown empty for purposes of illustration. Typically, any device bay(s) not used for electronic devices can be provided with a space-filling enclosure so as to maintain air flow through the other device bays and respective electronic devices located in the flow path 140.

Referring to FIG. 2, when situated in the device bay 128B, one end of the electronic device 135 can be supported by the upper surface 127 of the first support member 125, and one end can be supported by the second support members 131B and 131C. In a similar manner, electronic devices situated in device bays 128A and 128C can be supported on one end by the first support member 125 and on the other end by second support members 131A and 131B, and 131C and 131D, respectively. In this manner, electronic devices situated in the device bays, such as electronic devices 134, 135 situated in device bay 128B, can be located in the flow path 140. The electronic devices 134 and 135 can also be positioned adjacent the position reference plane 126, such that the position reference plane 126 defines the location of the electronic devices 134, 135 with respect to the first plenum 136, as best shown in FIGS. 1 and 3. In a similar manner, electronic devices situated in device bays 128A and 128C can be adjacent the position reference plane 126 such that the position reference plane 126 defines the location of such electronic devices with respect to the first plenum 136 as well.

Referring again to FIG. 1, the electronic devices 134 and 135 can include one or more fans to produce air flow along the flow path 140 and through the electronic devices 134 and 135. For example, electronic device 134 can include fans 142 and 143, and electronic device 135 can include fans 145 and 147. The electronic devices 134, 135 can also comprise respective vents 144, 149. In this manner, air flow produced by the fans 142, 143, 145, and 147 can flow from the first plenum 136, through the respective electronic devices 134 and 135, and into the second plenum 138 through vents 144, 149, as shown in FIG. 2.

In some embodiments, the air flow along the flow path 140 can be divided among the device bays 128A, 128B, and 128C, and can thereby be further divided between the electronic devices in each device bay. For example, the air flow through the device bay 128A can be divided between electronic device 134, as indicated by flow lines 156 and 158, and electronic device 135, as indicated by flow lines 157 and 159 (see FIG. 3). In this manner, relatively cool air from the first plenum 136 having a first temperature $T_1$ can flow through and cool the electronic devices 134 and 135. The warmed air having a temperature $T_2$ can then exit the electronic devices 134 and 135 through the respective vents 144 and 149, and flow into the second plenum 138. In other examples, cooler air from the second plenum 138 can be drawn through the electronic devices 134 and 135 toward the first plenum 136.

The apparatus 100 can also include an air-to-fluid heat exchanger 146 located in the enclosure 106. In the embodiment shown, the air-to-fluid heat exchanger 146 can be situated on, near, or otherwise spaced apart from the lower interior surface 108 of the enclosure 106 so as to be between the lower interior surface 108 and the device bays 128A, 128B, 128C. However, in alternative embodiments, the air-to-fluid heat exchanger 146 can be situated with respect to the top portion 102 so as to be on, near, or spaced apart from top portion 102, or at any other suitable location within the enclosure 106.

Figure 4:
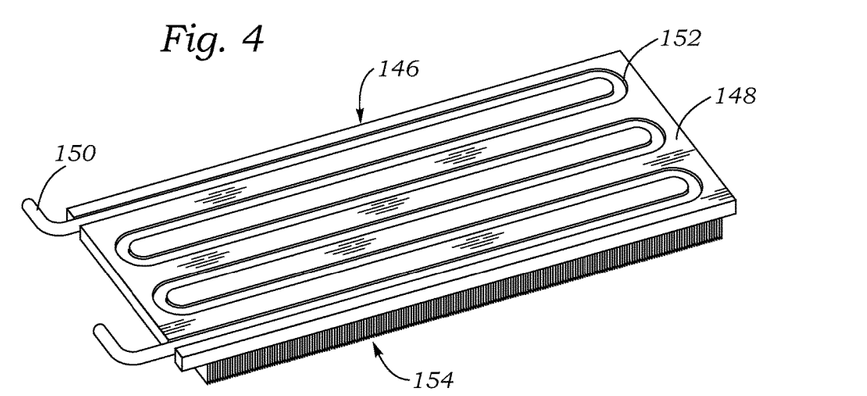
FIG. 4 is a perspective view of a representative embodiment of an air-to-fluid heat exchanger including a coolant conduit situated in a heat sink and including a plurality of fins.

In some embodiments, the air-to-fluid heat exchanger 146 can be configured as a finned-tube heat exchanger. As shown in FIG. 4, the air-to-fluid heat exchanger 146 can comprise a conductive substrate, such as a heat sink 148, which includes a coolant conduit 150. The coolant conduit 150 can be situated in a recess 152 in the heat sink 148, and can direct a flow of fluid and/or liquid coolant along its length such that heat is transferred from the heat sink 148 into the coolant in the conduit 150. The coolant conduit 150, and the associated recess 152 in the heat sink 148, can be shaped such that the coolant conduit 150 extends across the heat sink plate 148 in multiple passes. As used herein, the term "pass" refers to the number of times the coolant conduit 150 extends across the heat sink 148. For example, FIG. 4 illustrates a representative embodiment of the air-to-fluid heat exchanger 146 in which the coolant conduit 150 has six passes.

The air-to-fluid heat exchanger 146 can further include a plurality of fins, generally indicated at 154, coupled to the heat sink 148. The air-to-fluid heat exchanger 146 can include fins 154 on both sides of the heat sink 148, as shown in FIGS. 1-3, or on only one side, as shown in FIG. 4, as desired, and can be thermally coupled to the electronic devices in the device bays 128A, 128B, and 128C along the flow path 140. As described above, air having the second temperature $T_2$ can flow out of the electronic devices 134, 135, into the second plenum 138, and out of the second plenum 138 along the flow path 140 in the direction indicated by arrows 160 and 161. The air can then flow between the device bays 128A, 128B, 128C and the lower interior surface 108 such that the air flows across the plurality of fins 154 of the air-to-fluid heat exchanger 146, as indicated by flow lines 162 and 163. In this manner, heat can be transferred from the air to the plurality of fins 154 by convection, from the plurality of fins 154 to the heat sink 148 by conduction, and from the heat sink 148 into the coolant flowing through the coolant conduit 150 by convection, thereby cooling the air back to the first temperature $T_1$. The air can then return to the first plenum 136 along the flow path 140. In some embodiments, the electronic devices in the device bays 128A, 128B, and 128C can be spaced apart from the heat sink 148. The electronic devices in the device bays 128A, 128B, and 128C can also be spaced apart from the plurality of fins 154, or can contact the plurality of fins 154 to, for example, facilitate additional heat transfer through conduction, as desired. In alternative embodiments, the electronic devices in the device bays 128A, 128B, and 128C can contact the heat sink 148.

In some embodiments, the air flowing along the flow path 140 can be drawn across the fins 154 of the air-to-fluid heat exchanger 146 by one or more modular fans located in the first plenum 136, such as representative fan 164 (see FIGS. 1 and 3). The one or more fans such as representative fan 164 can be mounted in openings 166 defined in the angled surface 129 of the first support member 125. In this manner, the one or more fans such as representative fan 164 can be located in the flow path 140 adjacent the device bays 128A, 128B, 128C. In FIG. 1, the portion of the first support member 125 located adjacent the device bay 128C is shown without fans for purposes of illustration. In the embodiment shown, the angled surface 129 and, thereby, the one or more fans such as representative fan 164, can be oriented at an angle of about 45 degrees with respect to the lower interior surface 108 of the enclosure 106. In this manner, the one or more fans such as representative fan 164 can draw air from the second plenum 138 across the fins 154 of the air-to-fluid heat exchanger 146, as indicated by flow lines 162 and 163, and direct the flow of air upwardly into the first plenum 136, as indicated by flow lines 156 and 157. However, in alternative embodiments, the one or more fans such as representative fan 164 need not be oriented at the same angle as the angled surface 129 of the first support member 125, but can be oriented at any suitable orientation as determined by, for example, desired airflow direction along the flow path 140 and/or size constraints of the apparatus 100.

In some embodiments, the one or more fans such as representative fan 164 can operate in conjunction with the fans of the electronic devices such as fans 142 and 143 of electronic device 134, and fans 145 and 147 of electronic device 135. In some embodiments, the one or more fans such as representative fan 164 can operate in a supportive role with the fans 142 143, 145 and 147 by, for example, turning on and off as needed depending upon the heat load generated by the electronic devices. In alternative embodiments, the one or more fans such as representative fan 164 can be located in the first plenum 136, the second plenum 138, or beneath the device bays 128A, 128B, 128C adjacent the air-to-fluid heat exchanger 146, as desired.

In the embodiment shown, the enclosure 106 includes three fans such as representative fan 164 adjacent each respective device bay 128A, 128B, 128C. However, alternative embodiments can include any suitable number of fans of any suitable size associated with the respective device bays 128A, 128B, 128C. In some embodiments, the one or more fans such as fan 164 can provide an air flow rate of from about 150 cubic feet per minute to about 250 cubic feet per minute along the flow path 140. In some embodiments, the one or more fans such as fan 164 can provide an air flow rate of from about 220 cubic feet per minute along the flow path 140. In alternative embodiments, the apparatus 100 need not include fans such as representative fan 164.

The coolant conduit 150 of the air-to-fluid heat exchanger 146 can be in fluid communication with an inlet port 168 and an outlet port 170 located on the outside of the enclosure 106 (see FIGS. 1 and 2). The inlet and outlet ports 168, 170 can connect the air-to-fluid heat exchanger 146 to, for example, a coolant source (see, e.g., coolant source 730 of FIG. 10) external to the apparatus 100. In this manner, coolant can be circulated through the air-to-fluid heat exchanger 146, where it can receive heat generated by, for example, electronic devices 134 and 135, and conveyed to the air-to-fluid heat exchanger 146 by air flowing along the flow path 140, as described above. The coolant can then flow out of the apparatus 100 through the outlet port 170, thereby removing heat from the apparatus 100. In alternative embodiments, the apparatus 100 can include multiple air-to-fluid heat exchangers, which can be in fluid communication with common inlet and outlet ports such as the inlet and outlet ports 168, 170, or with individual inlet and outlet ports, as desired.

In some embodiments, the coolant conduit 150 can be fabricated from metal or plastic piping. In some embodiments, the coolant conduit 150 can have a diameter of, for example, ⅜ inch, ¼ inch, ½ inch, or any other suitable diameter, as desired. In some embodiments, the coolant conduit 150 can be made from copper tubing, can have a diameter of about ⅜ inch, and can be configured to supply coolant to the air-to-fluid heat exchanger 146 at a flow rate of about 1 gallon per minute.

In some embodiments, the coolant circulated through the air-to-fluid heat exchanger 146 can be water. In some embodiments, the coolant circulated through the air-to-fluid heat exchanger 146 can be an anti-freeze solution (e.g., ethanol, propylene glycol, etc.). In some embodiments, the coolant circulated through the air-to-fluid heat exchanger can be a mixture of water and anti-freeze, or any other suitable coolant. In some embodiments, the coolant can be a gas. In some embodiments, the coolant can change phases as it passes through the air-to-fluid heat exchanger 146. For example, the coolant can enter the air-to-fluid heat exchanger 146 in the liquid phase and leave the air-to-fluid heat exchanger 146 in the gas phase. In some embodiments, the air-to-fluid heat exchanger 146 can be configured to heat the air in the enclosure 106 by passing a fluid through the air-to-fluid heat exchanger 146 having a temperature that is higher than the temperature of the air circulating along the flow path 140.

Figure 5:
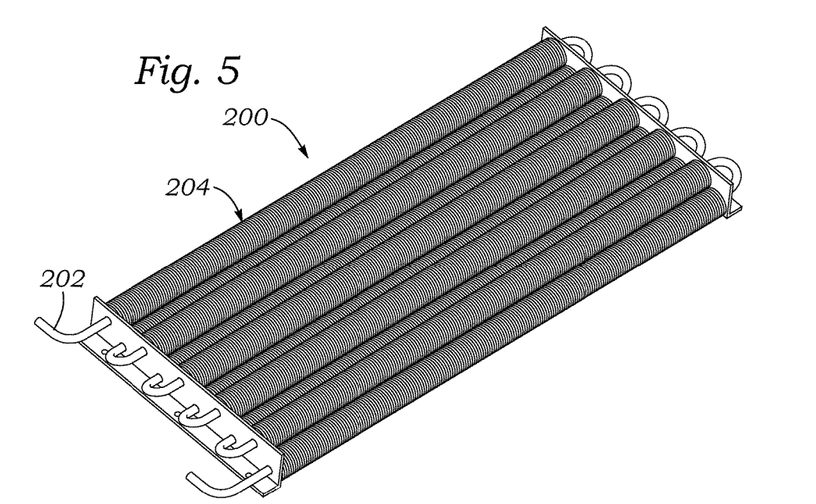
FIG. 5 is a perspective view of another embodiment of an air-to-fluid heat exchanger including arcuate fins situated around a coolant conduit.

FIG. 5 illustrates an alternative embodiment of an air-to-fluid heat exchanger 200. The air-to-fluid heat exchanger 200 can be a finned-tube heat exchanger, and can comprise a coolant conduit 202 including a plurality of fins generally indicated at 204. The fins 204 can have an annular shape, and can be coupled to the coolant conduit 202 such that the fins 204 surround the coolant conduit 202. In the embodiment shown, the coolant conduit 202 includes ten passes, and the fins 204 coupled to the coolant conduit 202 on one pass are spaced apart from the portions of the coolant conduit 202 of adjacent passes. In alternative embodiments, the coolant conduit 202 can have any suitable number of passes. The air-to-fluid heat exchanger 200 can be included in the apparatus 100 in the same manner as the air-to-fluid heat exchanger 146 described above.

Figure 6:
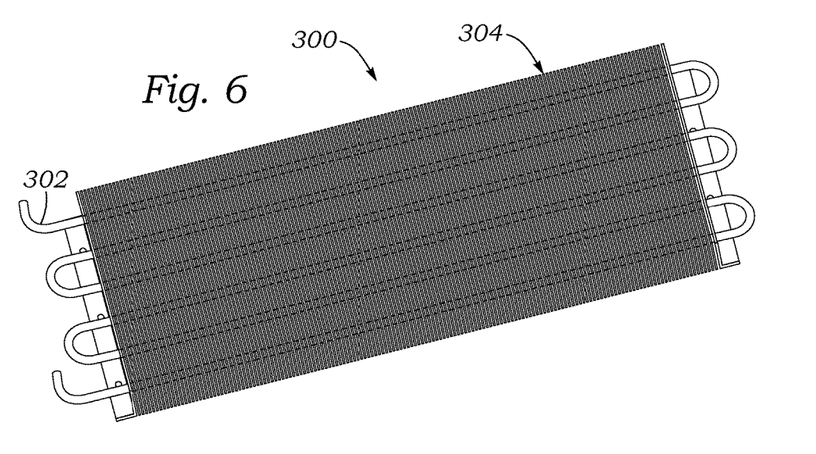
FIG. 6 is a perspective view of another embodiment of an air-to-fluid heat exchanger including rectangular fins.

FIG. 6 illustrates another alternative embodiment of an air-to-fluid heat exchanger 300. The air-to-fluid heat exchanger 300 can be a finned-tube heat exchanger, and can comprise a coolant conduit 302 including a plurality of fins generally indicated at 304. The fins 304 can have a rectangular shape, and can extend across the air-to-fluid heat exchanger 300 such that they are coupled to multiple passes of the coolant conduit 302. In the embodiment shown, the coolant conduit 302 includes six passes. However, the coolant conduit 302 can have any suitable number of passes. The air-to-fluid heat exchanger 300 can be included in the apparatus 100 in the same manner as the air-to-fluid heat exchanger 146 described above. In further alternative embodiments, any of the air-to-fluid heat exchangers disclosed herein can include a heat pipe.

In some embodiments, the electronic devices situated in the device bays, such as electronic devices 134 and 135 situated in device bay 128B, can be power supplies. The power supplies can convert an AC input into a DC output, and can be electrically connected together, as desired. For example, in the embodiment of FIG. 1, power supplies situated in each of the device bays 128A, 128B, and 128C can be electrically connected in parallel, and can be in electrical communication with respective terminals such as representative terminal 172 located on the rear wall 116 via electrical conductors, such as representative electrical conductor 174 configured as a bus bar. In this manner, the power supplies can be added and removed from the apparatus 100 as desired to meet the power requirements of a larger system into which the apparatus 100 is incorporated. This can allow the apparatus 100 to be used in high-power applications such as industrial laser cutting applications.

The heat transfer capability provided by circulating air along the flow path 140 between the power supplies and the air-to-fluid heat exchanger 146 can enable the use of relatively low-cost, commercial off-the-shelf (COTS) air-cooled power supply units, which can be installed and removed from the apparatus 100 as needed. In some embodiments, the apparatus 100 can be configured to restrict air flow between the interior of the enclosure 106 and the external environment. For example, in some embodiments the top and bottom portions 102, 104 of the apparatus 100 can form a seal such that air flowing along the flow path 140 within the enclosure 106 remains substantially within the enclosure 106, and air flow into and/or out of the enclosure 106 is restricted. In this manner, particulates and other debris entrained in the air of the external environment can be restricted from entering into the enclosure 106. This can allow the apparatus 100 to be used in dirty or dusty environments, such as industrial cutting environments, without allowing particles entrained in the air to enter the enclosure 106. This, in turn, can allow the COTS air-cooled power supplies to operate in a relatively dust-free environment within the enclosure 106. Additionally, the heat transfer provided by the air-to-fluid heat exchanger 146 can allow the COTS air-cooled power supplies to deliver the performance of more expensive, custom-fabricated, water-cooled power supply units within the air flow constraints imposed by the enclosure 106. In alternative embodiments, the top and bottom portions 102, 104 of the apparatus 100 can simply restrict air flow into and/or out of the enclosure 106 without forming a seal.

For example, in some embodiments the first temperature $T_1$ of air in the first plenum 136 can be from about 25 degrees Celsius to about 55 degrees Celsius, depending upon the type of power supplies and the system into which the apparatus 100 is incorporated. In some embodiments, the first temperature $T_1$ of air in the first plenum 136 can be from about 35 degrees Celsius to about 45 degrees Celsius. In some embodiments, the temperature $T_1$ can be about 40 degrees Celsius. In some embodiments, the temperature $T_2$ of the air exiting the power supplies can be from about 40 degrees Celsius to about 70 degrees Celsius. In some embodiments, the temperature $T_2$ of the air exiting the power supplies can be from about 50 degrees Celsius to about 60 degrees Celsius. In some embodiments, the temperature $T_2$ can be about 55 degrees Celsius. Thus, the heat transfer effected by the air-to-fluid heat exchanger 146 located in the flow path 140 can allow the power supplies to operate within the exterior air flow constraints imposed by the apparatus 100 within a selected temperature range, allowing COTS air-cooled power supplies to be used in industrial environments.

Suitable power supplies can include, for example, the RSP-3000 and the RCP-2000 manufactured by Mean Well USA, Inc., the CP2000AC54TEZ manufactured by General Electric Company, and the HFE2500 manufactured by TDK-Lambda Corporation. In alternative embodiments, the one or more electronic devices such as representative electronic device 134 can be configured as, for example, servers, blade servers, hard drives, transformers, central processing units (CPUs), graphics processing units (GPUs), etc.

In some embodiments, the top and bottom portions 102, 104 of the apparatus 100 can be fabricated from, for example, sheet metal. The one or more pieces of sheet metal can be formed into the appropriate shape by, for example, stamping, punching, bending, or any other suitable forming process. The respective top and bottom portions 102, 104 can be fabricated from a single piece of sheet metal, or can be formed from separate pieces of sheet metal and fastened together. Alternatively, the top and bottom portions 102, 104 can be fabricated from any other suitable material, such as plastic. The materials and methods of fabrication described above can be applied to any of the apparatus embodiments disclosed herein.

Figure 7:
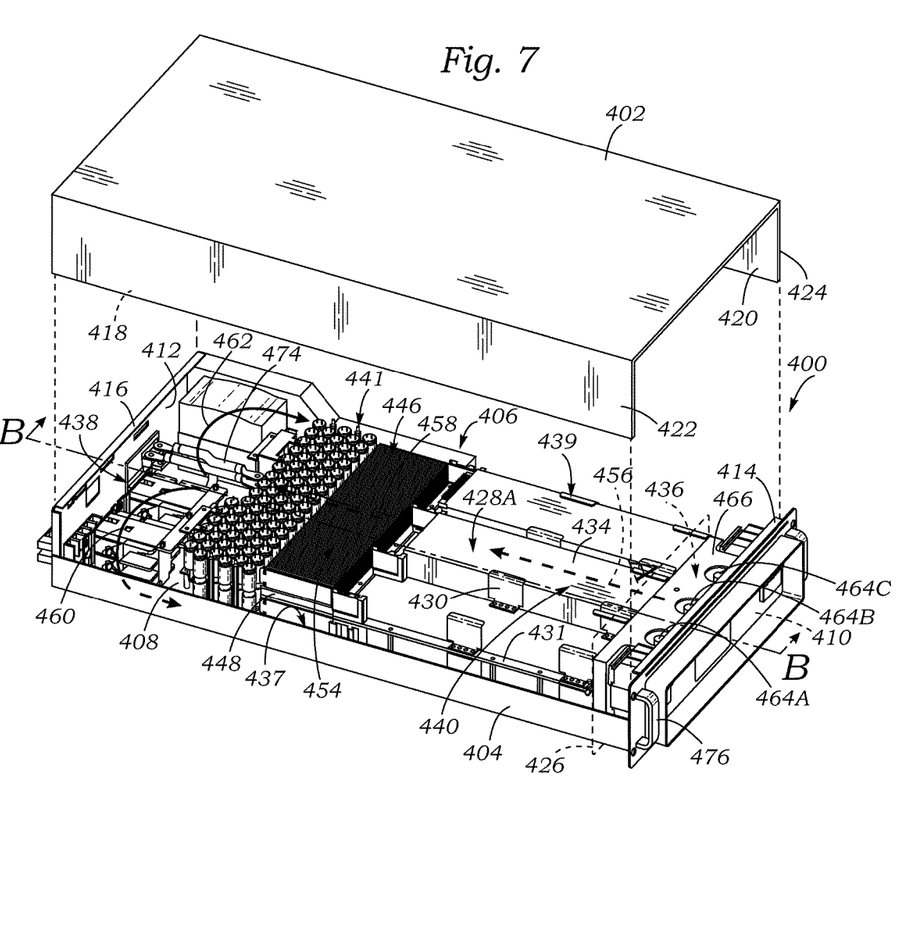
FIG. 7 is a perspective view of another embodiment of an apparatus.

FIG. 7 illustrates another embodiment of an apparatus 400 comprising a top portion 402 and a bottom portion 404 configured to engage one another to define an enclosure 406, similar to the apparatus of FIG. 1. The enclosure 406 can include a lower interior surface 408 (FIG. 8) defined by the bottom portion 404, and front and rear interior surfaces 410, 412 defined by respective front and rear walls 414, 416 of the bottom portion 404. The enclosure 406 can also include two interior side surfaces 418, 420 defined by respective side walls 422, 424 of the top portion 402.

The apparatus 400 can further include a support member 466, which can define a position reference plane 426 (indicated in phantom) within the enclosure 406, as shown in FIG. 7. The apparatus 400 can also include a plurality of device bays arranged in two groups of three adjacent device bays. The two groups of device bays can be arranged in a stacked arrangement and can be separated by a horizontal divider 431, as shown in FIG. 7. For purposes of illustration, the following description proceeds with respect to representative device bays 428A and 428B. However, it should be understood that the following description is applicable to any of the device bays of the apparatus 400. The two device bays 428 nearest the left-hand side wall 422 are shown empty for purposes of illustration.

As shown in FIG. 7, device bays 428A and 428B are arranged in a stacked arrangement such that device bay 428A is spaced apart from device bay 428B and separated from device bay 428B by the horizontal divider 431. The device bay 428A can include one or more brackets such as representative bracket 430 coupled to the horizontal divider 431, and the device bay 428B can include one or more brackets (not shown) similar to representative bracket 430 coupled to the lower interior surface 408 of the enclosure 406. In alternative embodiments, the apparatus 400 can include any suitable number of device bays 428. In further alternative embodiments, the rows of device bays 428 need not be separated by a horizontal divider.

Figure 8:
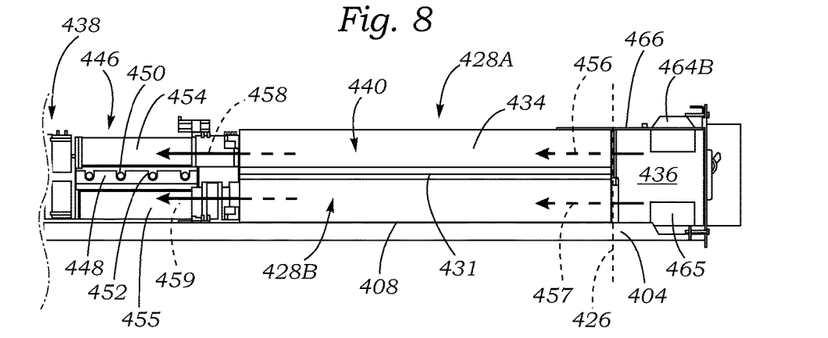
FIG. 8 is a cross-sectional view of the apparatus of FIG. 7 taken along line B-B of FIG. 7.

The position reference plane 426, together with the lower interior surface 408, the front interior surface 410, and the interior side surfaces 418, 420 can at least partially define a first plenum 436 within the enclosure 406. In the embodiment shown, the position reference plane 426 can define a boundary between the plurality of device bays, including device bays 428A and 428B, and the first plenum 436, as shown in FIG. 8. The first plenum 436 can be in fluid communication with the plurality of device bays, including device bays 428A and 428B, and with a second plenum 438 located on the opposite side of the enclosure 406 from the first plenum 436. The second plenum 438 can be at least partially defined by the lower interior surface 408, the rear interior surface 412, and the interior side surfaces 418, 420. In this manner, the enclosure 406 can define a flow path 440 along which air can be circulated through the enclosure 406, as shown in FIGS. 7 and 8.

Referring to FIG. 8, the flow path 440 can extend from the first plenum 436 and through the plurality of device bays, including device bays 428A and 428B, to the second plenum 438, as indicated by flow lines 456, 457, 458, and 459. The flow path 440 can further extend from the second plenum 438 back to the first plenum 436 along side passages 437, 439 defined within the enclosure 408, as indicated by flow lines 460 and 462, respectively (see, e.g., FIG. 7). In this manner, air can be circulated within the enclosure 406 with minimal contamination from the exterior environment.

The plurality of device bays, including device bays 428A and 428B, can be configured to receive one or more corresponding electronic devices. For example, a representative electronic device 434 is shown situated in device bay 428A. When situated in the plurality of device bays such as device bays 428A and 428B, the one or more electronic devices such as representative electronic device 434 can be located in the flow path 440. In the embodiment shown, each of the plurality of device bays, including device bays 428A and 428B, can be configured to receive one electronic device such as representative electronic device 434. Alternatively, the plurality of device bays, such as device bays 428A and 428B, can be configured to receive any suitable number of electronic devices.

The apparatus 400 can also include an air-to-fluid heat exchanger 446 located in the enclosure 406 and in fluid communication with an external coolant source (not shown), similar to the embodiment of FIG. 1. The air-to-fluid heat exchanger 446 can be situated adjacent the plurality of device bays, including device bays 428A and 428B, such that air flowing through the plurality of device bays along the flow path 440 passes through the air-to-fluid heat exchanger 446 before entering the second plenum 438. However, in alternative embodiments, the air-to-fluid heat exchanger 146 can be situated, for example, above the plurality of device bays, including device bays 428A and 428B, below the plurality of device bays, or at any other suitable location within the enclosure 406.

As illustrated in FIG. 8, the air-to-fluid heat exchanger 446 can be configured as a finned-tube heat exchanger including a heat sink 448 and a coolant conduit 450, similar to the embodiment of FIG. 1. The coolant conduit 450 can be situated in a recess 452 in the heat sink 448, and can direct a flow of coolant along its length such that heat is transferred from the heat sink 448 into the coolant in the conduit 450. In the embodiment shown, the air-to-fluid heat exchanger 446 can have four passes. However, in alternative embodiments, the air-to-fluid heat exchanger 446 can have any suitable number of passes depending upon the size of the enclosure 406 and the heat load.

The air-to-fluid heat exchanger 446 can include a plurality of fins 454 coupled to an upper surface of the heat sink 448 and a plurality of fins 455 coupled to a lower surface of the heat sink 448, similar to the embodiment of FIG. 1. In some embodiments, the air-to-fluid heat exchanger 446 can include fins coupled to both sides of the heat sink 448, as shown in FIGS. 7 and 8, or to only one side, as shown in FIG. 4, as desired. In the embodiment shown, the plurality of fins 454 coupled to the upper surface of the heat sink 448 and the plurality of fins 455 coupled to the lower surface of the heat sink 448 are sized such that the heat sink 448 is located at approximately the same height above the lower interior surface 408 as the horizontal divider 431. In this manner, the plurality of fins 454 coupled to the upper surface of the heat sink 448 can receive air exhausted from the one or more electronic devices situated above the horizontal divider 431, such as representative electronic device 434, while the plurality of fins 454 coupled to the lower surface of the heat sink 448 can receive air exhausted from the one or more electronic devices situated below the horizontal divider 431, as shown in FIGS. 7 and 8. In alternative embodiments, the apparatus 400 can include any of the air-to-fluid heat exchanger embodiments disclosed herein, including multiple air-to-fluid heat exchangers arranged in any desired arrangement.

The one or more electronic devices such as representative electronic device 434 can include one or more fans (not shown), which can produce air flow through the one or more electronic devices such as representative electronic device 434 along the flow path 440, similar to the embodiment of FIG. 1. In this manner, air from the first plenum 436 can flow through the one or more electronic devices such as representative electronic device 434, through the air-to-fluid heat exchanger 446, and into the second plenum 438. In the embodiment shown, air flowing along the flow path 440 between the first and second plenums 436, 438 can flow through the one or more electronic devices such as representative electronic device 434, as shown by flow line 456. In this manner, relatively cool air from the first plenum 436 having a first temperature $T_1$ can flow through and cool the one or more electronic devices such as representative electronic device 434.

The warmed air having a second temperature $T_2$ can then exit the one or more electronic devices such as representative electronic device 434 and flow across the plurality of fins 454 and/or the plurality of fins 455 of the air-to-fluid heat exchanger 446, such that the air is cooled back to the first temperature $T_1$. The air can then flow into the second plenum 438. In the embodiment shown, after exiting the air-to-fluid heat exchanger 446, the air can flow through a plurality of capacitors, generally indicated at 441, located in the enclosure 406 adjacent the air-to-fluid heat exchanger 446. However, in alternative embodiments, the enclosure 406 need not include the plurality of capacitors 441. Air having the temperature $T_1$ can then flow back to the first plenum 436 along the side passages 437, 439, as indicated by flow lines 460 and 462, respectively. The temperature ranges of $T_1$ and $T_2$ can be similar to those described above with respect to FIG. 1.

In some embodiments, the air can be drawn through the side passages 437, 439 back to the first plenum 436 by one or more modular fans located in the first plenum 436, such as fans 464A, 464B, and 464C. The fans 464A, 464B, 464C can be situated in the support member 466 adjacent the front wall 414. In the embodiment shown, the fans 464A, 464B, 464C can be oriented orthogonally with respect to the lower interior surface 408 of the enclosure 106. In this manner, the fans 464A, 464B, 464C can draw air from the second plenum 438 to the first plenum 436 along the side passages 437 and 439, and direct the flow of air upwardly into the first plenum 436. In the embodiment shown, the support member 466 can include two spaced-apart rows of fans. For example, fans 464A, 464B, and 464C can be located in an upper row, and fan 465 (see FIG. 8) can be located in a lower row. However, in alternative embodiments, the apparatus 400 can include any suitable number of fans arranged in any suitable arrangement. Additionally, the fans 464A, 464B, 464C, and/or fan 465, can be located in the first plenum 436, the second plenum 438, in the side passages 437 and/or 439, etc.

In some embodiments, the one or more electronic devices such as representative electronic device 434 can be power supplies, as described above with respect to the embodiment of FIG. 1. The power supplies can convert an AC input into a DC output, and can be electrically connected together, as desired. For example, in the embodiment of FIG. 7, the power supplies in the plurality of device bays, including device bays 428A and 428B, can be electrically connected in parallel, and can be in electrical communication with respective terminals (not shown) located on the rear wall 416 of the apparatus 400 via electrical conductors, such as representative electrical conductor 474. In this manner, the power supplies can be added and removed from the apparatus 400 as desired to meet the power requirements of a larger system into which the apparatus 400 is incorporated, allowing the apparatus 400 to be used in high-power applications such as industrial laser cutting applications.

The heat transfer capability provided by circulating air along the flow path 440 between the power supplies and the air-to-fluid heat exchanger 446 can enable the use of relatively low-cost, COTS air-cooled power supply units, which can be installed and removed from the apparatus 400 as needed, as described above. This can allow the COTS air-cooled power supplies to deliver the performance of more expensive, custom fabricated water-cooled power supply units within the air flow constraints imposed by the enclosure 406, as described above.

Figure 9:
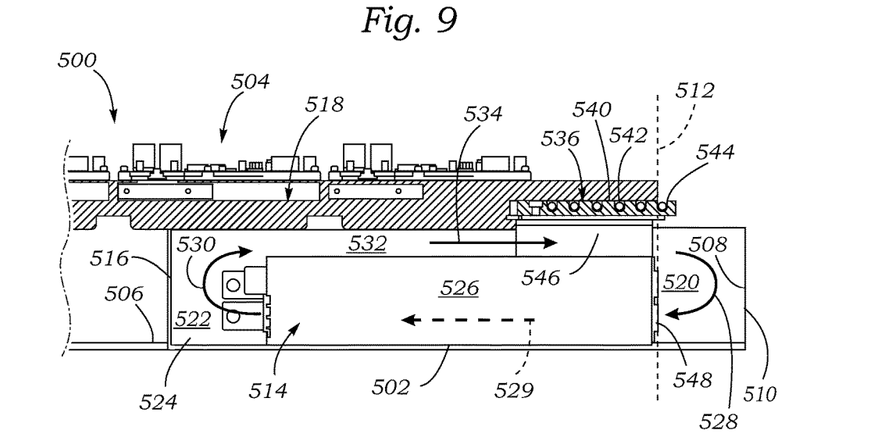
FIG. 9 is a cross-sectional view of another embodiment of an apparatus.

FIG. 9 illustrates another embodiment of an apparatus 500 shown in partial cross-section. The apparatus 500 can include a top portion (not shown) and a bottom portion 502, the top and bottom portions together defining an enclosure 504, similar to the embodiment of FIG. 1. The enclosure 504 is at least partially defined by a lower interior surface 506 of the bottom portion 502, and a front interior surface 508 of a front wall 510 of the bottom portion 502. Although the following description proceeds with respect to the front wall 510 for purposes of illustration, it should be understood that similar arrangements can be made with respect to any wall of the apparatus 500.

The apparatus 500 can further include a support member 518 positioned within the enclosure 504. The apparatus 500 can also include one or more device bays, such as device bay 514. The device bay 514 can be at least partially defined by the support member 518 and one or more interior walls, such as interior wall 516. The interior wall 516 can be located within the enclosure 504, and can extend orthogonally between the lower interior surface 506 and the support member 518. In some embodiments, the support member 518 can be at least partially supported by the interior wall 516, as shown in FIG. 9, and can include a plurality of circuit elements mounted thereon. The apparatus 500 can include any suitable number of device bays 514, similar to the embodiments described above.

The support member 518 can define a position reference plane 512 (indicated in phantom). The position reference plane 512 can be coincident with an edge of the support member 518, and can define a boundary between the device bay 514 and a first plenum 520. The first plenum 520, in turn, can be at least partially defined by the lower interior surface 506, the front interior surface 508, and the position reference plane 512, and can be in fluid communication with the device bay 514. The first plenum 520 can also be in fluid communication with a second plenum 522 defined within the device bay 514 opposite the first plenum 520. The second plenum 522 can be at least partially defined by the lower interior surface 506, the interior wall 516, and the support member 518, as shown in FIG. 9. In this manner, the enclosure 504 can define a flow path 524 extending from the first plenum 520, through the mounting bay 514, and back to the first plenum 520, along which air can be circulated as indicated by arrows 528, 529, 530, and 534.

The device bay 514 can also be configured to receive one or more electronic devices, such electronic device 526, such that the electronic device 526 is located in the flow path 524. In this manner, air flowing along the flow path 524 can flow through the electronic device 526, as indicated by flow lines 528, 529, and 530. An upper surface of the electronic device 526 and the support member 518 can further define a passageway 532 along the flow path 524 such that air can flow from the second plenum 522 back to the first plenum 520, as indicated by flow line 534. In this manner, the flow path 524 can be bounded by the enclosure 504 such that air can be circulated along the flow path 524 with minimal contamination from the exterior environment.

The apparatus 500 can also include an air-to-fluid heat exchanger 536 located in the enclosure 504. The air-to-fluid heat exchanger 536 can be in fluid communication with an external coolant source (not shown), and can be coupled to the support member 518 such that it is spaced apart from the lower interior surface 506 and positioned above the device bay 514. In alternative embodiments, the air-to-fluid heat exchanger 536 can be situated at any other suitable location within the enclosure 504.

In some embodiments, the air-to-fluid heat exchanger 536 can comprise a heat sink 540 including a coolant conduit 542, as shown in FIG. 9. The coolant conduit 542 can be situated in a recess 544 in the heat sink 540, and can direct a flow of coolant along its length such that heat is transferred from the heat sink 540 into the coolant in the conduit 542, as previously described. In the embodiment shown, the air-to-fluid heat exchanger 536 can have six passes. However, in alternative embodiments, the air-to-fluid heat exchanger 536 can have any suitable number of passes.

The air-to-fluid heat exchanger 536 can further include a plurality of fins 546 coupled to the heat sink 540. The plurality of fins 546 can extend orthogonally to the heat sink 540 into the flow path 524, as shown in FIG. 9. In this manner, air exhausted from the electronic device 526 can flow across the plurality of fins 546. In some embodiments, the plurality of fins 546 can contact the electronic device 526 to, for example, facilitate additional conductive heat transfer from the electronic device 526 to the heat sink 540. In alternative embodiments, the apparatus 500 can include any of the air-to-fluid heat exchanger embodiments disclosed herein, including multiple air-to-fluid heat exchangers arranged in any desired arrangement.

The electronic device 526 can include one or more fans, such as fan 548, which can produce air flow through the electronic device 526 and along the flow path 524, similar to the embodiment of FIG. 1. In this manner, relatively cool air from the first plenum 520 having a first temperature $T_1$ can flow through and cool the electronic device 526, as indicated by flow arrows 528 and 529. The warmed air having a second temperature T$_2$ can then exit the electronic device 526 and flow into the second plenum 522, as indicated by flow line 530. From the second plenum 522, the air can flow over the top of the electronic device 526, through the passageway 532, and across the plurality fins 546 of the air-to-fluid heat exchanger 536, as indicated by flow line 534. In this manner, heat can be transferred from the air flowing along the flow path 524 to the coolant flowing through the coolant conduit 542 such that the air is cooled back to the first temperature T$_1$. The air can then flow back into the first plenum 520, where it can be recirculated.

In some embodiments, the electronic device 526 can be a power supply, as described above with respect to the embodiment of FIG. 1. The power supply can convert an AC input into a DC output, and can be electrically connected together with other power supplies in the apparatus, as desired. In this manner, the power supplies can be added and/or removed from the apparatus 500 to meet the power requirements of a larger system into which the apparatus 500 is incorporated, allowing the apparatus 500 to be used in high-power applications such as industrial laser cutting applications.

Figure 10:
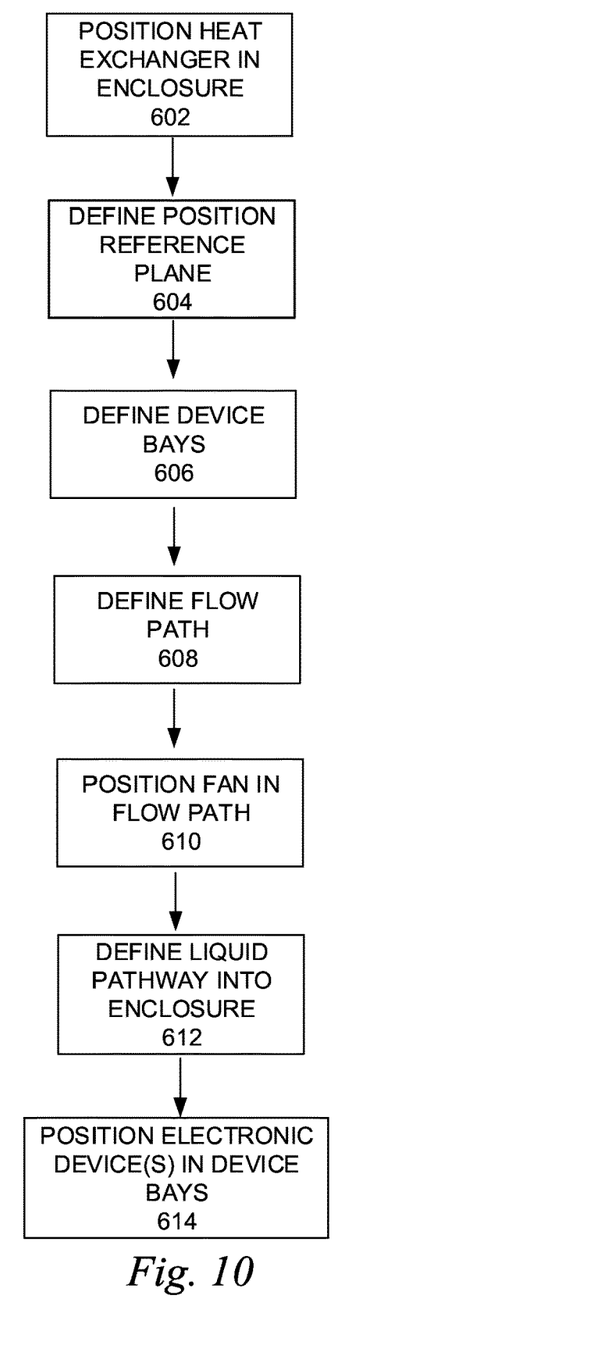
FIG. 10 is a schematic block diagram illustrating a method of making an apparatus.

FIG. 10 illustrates a schematic block diagram of a representative method of making an apparatus, such as any of the apparatuses described herein. At step 602, an air-to-fluid heat exchanger can be positioned within an enclosure that at least partially defines a plenum. At step 604, a position reference plane can be defined within the enclosure. In some embodiments, the position reference plane can be defined by a support member, and the position reference plane can at least partially define the plenum. At step 606, one or more device bays can be defined within the enclosure. The one or more device bays can be configured to receive at least one corresponding electronic device, and the position reference plane can define a boundary between the one or more mounting bays and the plenum. At step 608, a flow path can be defined within the enclosure such that the flow path is bounded by the enclosure. The flow path can fluidly couple the air-to-fluid heat exchanger with the one or more device bays via the plenum. At step 610, at least one fan can be positioned in the flow path to produce air flow along the flow path. At step 612, a fluid pathway into the enclosure can be defined so that the air-to-fluid heat exchanger is fluidly coupled to an external fluid (e.g., coolant) source. At step 614, one or more electronic devices can be positioned in the one or more device bays adjacent the position reference plane such that the one or more electronic devices are located in the flow path.

The following example is provided to illustrate certain features of a working embodiment. A person of ordinary skill in the art will appreciate that the scope of the present invention is not limited to the scope of the features exemplified by this example.

Example 1

The disclosed apparatus embodiments can be useful for electrical systems, including fiber laser systems. An apparatus 720 similar to the apparatus embodiments disclosed herein can be incorporated into a fiber laser system 700, illustrated schematically in FIG. 11. In some embodiments, the fiber laser system 700 can be a multi-kilowatt continuous wave fiber laser system (e.g., a multi-mode fiber laser system, a single mode fiber laser system, a direct diode fiber laser system, etc.), and can be useful for cutting, welding, drilling, directed energy, etc.

Figure 11:
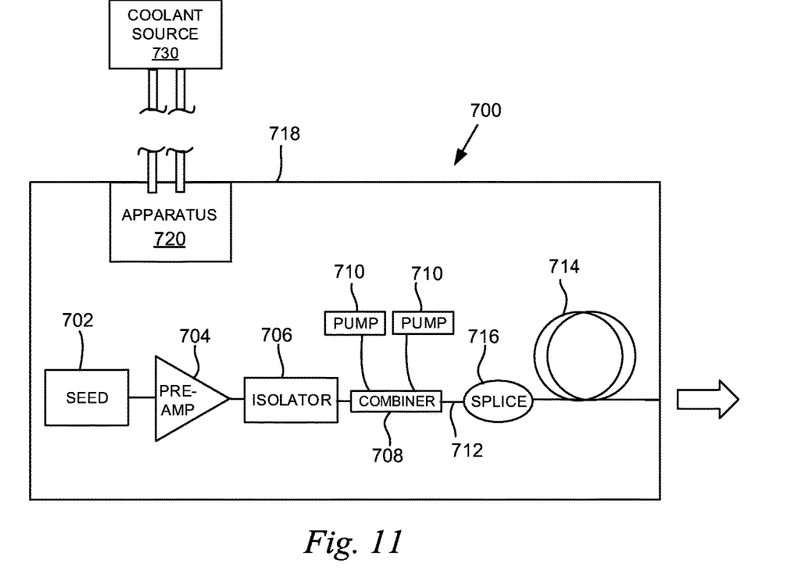
FIG. 11 is a schematic illustration of a representative fiber laser system including an apparatus fluidly coupled to an external fluid supply.

Referring to FIG. 11, the fiber laser system 700 can include a pulsed seed source laser 702 in communication with one or more pre-amplifiers or pre-amplification stages 704. The seed source 702 can be configured to provide relatively low power laser pulses at a predetermined pulse width and repetition rate. For example, one suitable pulse width may be 100 ps and a suitable repetition rate may be 10 MHz. The system 700 can comprise one or more optical isolators 706 configured to reduce feedback between components of the system 700. The system 700 can further comprise a pump combiner 708 configured to couple pump radiation from one or more pump radiation sources, such as pump laser diodes 710, into the cladding or core of a passive optical fiber 712. The pump combiner 708 can also couple the signal light from the seed source 702 into the core of the passive fiber 712.

The passive fiber 712 can be in communication with an active fiber 714 via a splice 716. Pump light can enter the core of the active fiber 714, which can thereby amplify the seed pulse of the seed source 702. The active fiber 714 can be configured to output a diffraction-limited output beam or other beam for use in, for example, industrial cutting applications.

The fiber laser system 700 can be configured to receive the apparatus 720 in a body or housing 718, as shown schematically in FIG. 11, and the apparatus 720 can be freely connected and removed from the fiber laser system 700. The apparatus 720 can include at least one electronic device, such as the COTS air-cooled power supplies described above, situated in at least one device bay. In this manner, the COTS air-cooled power supplies can provide electrical power to the various components of the fiber laser system 700 even when the fiber laser system 700 is operating in dirty or dusty industrial laser cutting environments. The apparatus 720 can also be fluidly coupled to an external coolant source 730 configured to supply coolant to and direct coolant away from an air-to-fluid heat exchanger situated inside the apparatus 720, allowing the at least one power supply to operate within a specified temperature range. In alternative embodiments, the apparatus 720 can be electrically connected to the fiber laser system 700 but positioned externally to the housing 718, or otherwise remotely located from the fiber laser system 700.

In view of the many possible embodiments to which the principles of the disclosure may be applied, it should be recognized that the illustrated embodiments are only preferred examples and should not be taken as limiting the scope of the disclosure. Rather, the scope of the disclosure is defined by the following claims. We therefore claim all that comes within the scope and spirit of these claims.

We claim:
1. An apparatus, comprising:
an enclosure including one or more interior surfaces, the one or more interior surfaces at least partially defining a plenum, the one or more interior surfaces including a lower interior surface;
a support member situated in the enclosure on the lower interior surface and defining a position reference plane, the position reference plane at least partially defining the plenum;
an air-to-fluid heat exchanger situated in the enclosure on the lower interior surface adjacent the support member; and
one or more device bays configured to receive at least one corresponding electronic device, the one or more device bays being located adjacent the support member such that the position reference plane defines a boundary between the one or more device bays and the plenum;
wherein the one or more device bays, the plenum, and the air-to-fluid heat exchanger are in fluid communication with one another along a flow path defined within the enclosure, the enclosure restricting an air flow along the flow path from exiting the enclosure; and
wherein when one or more electronic devices are positioned on the support member in the one or more device bays, the one or more electronic devices are spaced apart from the lower interior surface and from the heat exchanger by the support member, and the heat exchanger is located between the lower interior surface and the one or more electronic devices.

2. The apparatus of claim 1, wherein the one or more device bays are in fluid communication with the air-to-fluid heat exchanger via the plenum.

3. The apparatus of claim 1, further comprising one or more electronic devices situated in the one or more device bays such that the one or more electronic devices are located in the flow path.

4. The apparatus of claim 3, wherein:
the air-to-fluid heat exchanger includes a heat sink having a finned surface; and
the finned surface faces and is spaced apart from the one or more electronic devices.

5. The apparatus of claim 3, wherein the one or more electronic devices are power supplies, hard drives, servers or any combination thereof.

6. The apparatus of claim 3, wherein the one or more electronic devices and the air-to-fluid heat exchanger are thermally coupled by air flowing along the flow path; and
the air-to-fluid heat exchanger is in fluid communication with an external coolant source.

7. The apparatus of claim 1 further comprising a fiber laser that includes at least one pump laser diode, wherein at least one power supply is situated in at least one device bay, and the at least one power supply is coupled to the at least one pump laser diode so as to activate the pump laser diode.

8. A method, comprising:
positioning an air-to-fluid heat exchanger on a lower interior surface of an enclosure, the enclosure at least partially defining a plenum;
positioning a support member on a lower interior surface of the enclosure such that the support member defines a position reference plane within the enclosure, the position reference plane at least partially defining the plenum;
defining one or more device bays within the enclosure configured to receive at least one corresponding electronic device, the position reference plane defining a boundary between the one or more device bays and the plenum;
defining a flow path within and bounded by the enclosure, the flow path fluidly coupling the air-to-fluid heat exchanger to the one or more device bays via the plenum;
positioning at least one fan in the flow path to produce air flow along the flow path;
defining a fluid pathway into the enclosure so that the air-to-fluid heat exchanger is fluidly coupled to an external coolant source; and
positioning one or more electronic devices on the support member in the one or more device bays such that the one or more electronic devices are spaced apart from the lower interior surface and from the heat exchanger by the support member, and such that the heat exchanger is located between the lower interior surface and the one or more electronic devices.

9. The method of claim 8, wherein defining the flow path further comprises defining the flow path such that the temperature of air exhausted from the one or more electronic devices is lowered from a high temperature of from about 50 degrees Celsius to about 60 degrees Celsius to a low temperature of from about 30 degrees Celsius to about 40 degrees Celsius.

10. The method of claim 8, wherein:
the one or more electronic devices comprise a plurality of power supplies; and
positioning the one or more electronic devices further comprises connecting the plurality of power supplies in parallel.

11. The method of claim 8, further comprising supplying coolant to the air-to-fluid heat exchanger along the fluid pathway.

12. The method of claim 8, further comprising coupling the enclosure to a fiber laser system that includes at least one pump laser diode, wherein at least one of the one or more electronic devices situated in the one or more device bays is a power supply, and the power supply is coupled to the at least one pump laser diode so as to activate the pump laser diode.

13. A fiber laser system, comprising:
a seed optical source;
an active fiber coupled to receive a seed pulse from the seed optical source;
a pump combiner coupled to the active fiber and to at least one pump source;
at least one pump fiber coupled to the pump combiner and to the at least one pump source so as to deliver pump radiation to the active fiber; and
an apparatus comprising an enclosure including one or more interior surfaces, the one or more interior surfaces including a lower interior surface and at least partially defining a plenum, a support member situated in the enclosure on the lower interior surface and defining a position reference plane, the position reference plane at least partially defining the plenum, an air-to-fluid heat exchanger situated in the enclosure on the lower interior surface adjacent the support member, and one or more device bays defined within the enclosure and configured to receive at least one corresponding electronic device, the one or more device bays being located adjacent the support member such that the position reference plane defines a boundary between the one or more device bays and the plenum, the enclosure defining a flow path such that the one or more device bays, the plenum, and the air-to-fluid heat exchanger are in fluid communication with one another, the enclosure restricting air flow along the flow path from exiting the enclosure;
wherein when one or more electronic devices are positioned on the support member in the one or more device bays, the one or more electronic devices are spaced apart from the lower interior surface and from the heat exchanger by the support member, and the heat exchanger is located between the lower interior surface and the one or more electronic devices.

14. The fiber laser system of claim 12, wherein the one or more electronic devices are power supplies that supply electrical power to the at least one pump source.

15. The fiber laser system of claim 12, wherein the air-to-fluid heat exchanger is in fluid communication with an external coolant source.

16. The apparatus of claim 1,
wherein the support member is configured to support one or more electronic devices above the air-to-fluid heat exchanger such that the one or more electronic devices extend over the air-to-fluid heat exchanger when received in the one or more device bays.

17. The apparatus of claim 1, further comprising one or more fans coupled to the support member to produce air flow along the flow path.

18. The apparatus of claim 17, wherein:
the support member comprises an upper surface configured to support one or more electronic devices thereon, and an angled surface that is angled relative to the lower interior surface of the enclosure and oriented toward a side wall of the enclosure; and
the one or more fans are coupled to the angled surface of the support member.

19. The apparatus of claim 18, wherein the angled surface of the support member defines one or more openings such that the one or more fans can draw air along the flow path through the one or more openings and into the plenum.

20. The apparatus of claim 18, wherein:
the support member is a first support member;
each of the one or more device bays further comprises at least one second support member situated on the opposite side of the air-to-fluid heat exchanger from the first support member; and
each of the at least one second support members comprises an upper surface such that when an electronic device is received in the one or more device bays, the electronic device is supported on the upper surface of the first support member and the upper surface of the at least one second support member above the air-to-fluid heat exchanger.

21. The apparatus of claim 1, wherein the air-to-fluid heat exchanger and the support member are oriented along a length dimension of the enclosure, and the one or more device bays are oriented along a width dimension of the enclosure perpendicular to the air-to-fluid heat exchanger and the support member.

22. The apparatus of claim 21, wherein the one or more device bays are defined by one or more divider members coupled to the lower interior surface of the enclosure on opposite sides of the air-to-fluid heat exchanger such that the one or more divider members extend over the air-to-fluid heat exchanger.

* * * * *